(12) United States Patent
Vauchel et al.

(10) Patent No.: US 8,333,344 B2
(45) Date of Patent: Dec. 18, 2012

(54) AIRCRAFT NACELLE GUIDANCE SYSTEM INSTALLATION

(75) Inventors: Guy Bernard Vauchel, Harfleur (FR); Jean-Philippe Dauguet, Tournefeuille (FR); Stephane Beilliard, Toulouse (FR)

(73) Assignee: Aircelle, Gonfreville l'Orcher ( * ) Notice: Subject to any disclaimer, the term of this patent is extended or adjusted under 35 U.S.C. 154(b) by 113 days.

(21) Appl. No.: 12/742,850

(22) PCT Filed: Sep. 10, 2008

(86) PCT No.: PCT/FR2008/001262
§ 371 (c)(1),
(2), (4) Date: May 13, 2010

(87) PCT Pub. No.: WO2009/080904
PCT Pub. Date: Jul. 2, 2009

(65) Prior Publication Data
US 2010/0252689 A1    Oct. 7, 2010

(30) Foreign Application Priority Data

Dec. 26, 2007   (FR) ..................................... 07 09105

(51) Int. Cl.
*B64D 33/02* (2006.01)
(52) U.S. Cl. ..................................... 244/53 B; 244/1 N
(58) Field of Classification Search .................. 244/1 N, 244/53 B, 53 R
See application file for complete search history.

(56) References Cited

U.S. PATENT DOCUMENTS

| 4,688,757 | A | 8/1987 | Cook et al. |
| 5,609,313 | A * | 3/1997 | Cole et al. ........................ 244/54 |
| 6,179,249 | B1 * | 1/2001 | Canadas ..................... 244/53 R |
| 6,340,135 | B1 | 1/2002 | Barton |

FOREIGN PATENT DOCUMENTS

| EP | 1495963 | 1/2005 |
| FR | 0608599 | 7/1926 |
| FR | 2757823 | 7/1998 |
| GB | 2274490 | 7/1994 |

OTHER PUBLICATIONS

International Search Report; PCT/FR2008/001262; dated Apr. 23, 2009.

* cited by examiner

*Primary Examiner* — Timothy D Collins
*Assistant Examiner* — Jamie S Stehle
(74) *Attorney, Agent, or Firm* — Brinks Hofer Gilson & Lione

(57) ABSTRACT

A nacelle includes a central structure intended to surround a fan of a turbojet engine and an air intake structure attached to the central structure and able to channel a flow of air toward the fan. The nacelle includes at least one longitudinal outer panel incorporating an air intake lip. An inner panel includes an acoustic shell ring which downstream end is attached to an upstream end of the central structure and therewith forms a fixed structure of the nacelle. Guide means are entirely attached to the central structure for guiding the outer panel or panels and allowing substantially rectilinear movement of the outer panel towards the upstream end of the nacelle so that the air intake structure can be opened.

16 Claims, 8 Drawing Sheets

AIRCRAFT NACELLE GUIDANCE SYSTEM INSTALLATION

TECHNICAL FIELD

The present invention relates to a nacelle for a turbojet engine comprising an air intake structure able to channel a flow of air toward a fan of the turbojet engine, and a central structure intended to surround said fan and to which the air intake structure is attached.

BRIEF DISCUSSION OF RELATED ART

In general, an aircraft nacelle has a structure comprising an air intake structure, a central structure and a downstream section. What is meant here by "downstream" is the direction corresponding to the direction in which the cold air entering the turbojet engine flows. The term "upstream" denotes the opposite direction.

The air intake structure is situated upstream of the turbojet engine used to propel the aircraft. Downstream of the air intake structure, the central structure is intended to surround a fan of the turbojet engine. Further downstream still there is the downstream section which generally houses the thrust reverser means intended to surround the combustion chamber of the turbojet engine. The nacelle ends in a jet pipe, the outlet of which is situated downstream of the turbojet engine.

The air intake structure comprises, on the one hand, an air intake lip and, on the other hand, a downstream structure to which the lip is attached. The air intake lip is designed for optimally gathering toward the turbojet engine the air needed to supply the fan and the internal compressors of the turbojet engine. The downstream structure for its part is intended to channel the air appropriately toward the blades of the fan. This downstream structure generally comprises an outer panel and an inner panel. The inner panel comprises an acoustic shell ring able to deaden the noise generated by the turbojet engine and to damp the vibrations of the structures. The downstream structure and the air intake lip are both attached upstream of a fan casing belonging to the central structure of the nacelle.

Depending on the temperature and relative humidity conditions on the ground or in flight, ice may be deposited on the profile of the lip, particularly on the interior profile. This ice formation may be dangerous to the mechanical operation of the fixed and rotary parts of the turbojet engine and cause a drop-off in performance. Systems for deicing this part of the air intake lip have therefore been developed in an attempt to solve this problem. Particular mention may be made of documents U.S. Pat. No. 4,688,757 and EP 1 495 963.

At the present time, maintenance operations on this equipment housed inside the air intake structure oblige the manufacturers to provide hatches for accessing these various equipment items. However, these hatches are not always sufficient, sometimes requiring the internal equipment of the air intake structure to be inspected using specialist tools, such as an endoscope. Such specialist tools are not always entirely satisfactory in terms of their ability to check this equipment.

Furthermore, in order to replace some of the internal equipment, it is generally necessary to remove the entirety of the air intake structure. Such removal requires a significant amount of tooling and results in a lengthy down-time for the propulsion system and therefore generally for the airplane.

Patent Application FR 06/08599 proposes an air intake structure formed of the outer panel attached to the air intake lip and at least one inner panel attached to the casing of a central structure. The air intake structure is capable of a translational movement in relation to the central structure by means of a system of rails attached to the acoustic shell ring.

Such an air intake structure has the disadvantage of reducing the effective acoustic surface area of the acoustic shell ring. In addition, in the open position, the system of rails does not allow the air intake structure to be moved back far enough to be able to reach the components situated inside the air intake and which are difficult to access.

What is meant here by "open position" is the configuration in which the air intake structure has undergone an upstream translational movement. The open position corresponds to a configuration in which the aircraft is on the ground ready for maintenance to be carried out.

What is meant here by "closed position" is the configuration in which the air intake lip is attached to the upstream end of the inner panel or panels. The closed position corresponds to a configuration in which the aircraft can fly.

It is an object of the present invention therefore to provide a nacelle that allows easier maintenance while at the same time retaining a large effective acoustic surface area.

BRIEF SUMMARY

To this end, a first aspect of the invention relates to a nacelle for a turbojet engine comprising:
- an air intake structure able to channel a flow of air toward a fan of the turbojet engine, and comprising at least one longitudinal outer panel incorporating an air intake lip,
- a central structure intended to surround said fan and to which the air intake structure is attached in such a way as to ensure aerodynamic continuity,
- at least one inner panel comprising an acoustic shell ring, attached at its downstream end to an upstream end of the central structure and therewith forming a fixed structure of the nacelle, and
- guide means for guiding the outer panel or panels and able to allow substantially rectilinear movement of the outer panel toward the upstream end of the nacelle so that the air intake structure can be opened, characterized in that the guide means are entirely attached to the central structure.

First, because the guide means are fixed downstream of the inner panel(s), the outer panel(s) undergo a translational movement over a longer distance than they did in Patent Application FR 06/08599, causing a wider opening in the open position. Thus, for each maintenance operation, the air intake structure undergoes a translational movement in relation to the central structure in the upstream direction of the nacelle so as to allow ease of access to the components situated inside the air intake structure (the deicing means, etc.).

Second, the nacelle according to the invention comprises guide means which are not attached to the acoustic shell ring. Thus, practically the entirety of the acoustic surface area of this shell ring can be used to deaden the noise generated by the turbojet engine and to damp the vibrations of the structures.

Third, the nacelle according to the invention allows the acoustic shell ring to be removed without altering the positioning of the guide means. Thus, upon each change of acoustic shell ring, there is no need for the guide means to be repositioned accurately on the outer panel or on the central structure.

According to other features of the invention, the structure according to the invention comprises one or more of the following optional features considered alone or in any possible combination:

the guide means are attached to a casing of the central structure, said casing being intended to surround the fan and to provide aerodynamic continuity with the inner panel;

the upstream end of the casing comprises a plurality of orifices for adapting the attachment of the guide means to suit the positioning of said guide means, which makes it possible for the fixing of the guide means to the casing to be adapted to suit the optimal position of the guide means;

the guide means comprise at least one system of rails and mounting means for mounting the outer panel or panels on the system(s) of rails, which allows easy movement of the outer panel(s) and also ensures the structural integrity of the central structure;

at least part of the mounting means is situated downstream of the region where the central structure and one or more inner panel(s) meet in the closed position, which allows better open access because the mounting means carry the outer panel or panels over a longer distance;

the mounting means comprise at least one slider able to collaborate with at least one corresponding rail;

the mounting means comprise at least one system of linear roller bearings able to collaborate with a corresponding rail;

the mounting means comprise a guideway system able to collaborate with at least one corresponding channel-shaped rail;

the guide means comprise at least one longitudinal pin able to slide through a corresponding opening;

the guide means comprise a recess essentially transverse to the axis of the nacelle, said recess being situated downstream of the inner panel(s), which, for example, allows engine components of the pipework and wiring type to be routed more easily;

at least one outer panel has a front frame that can be attached to a bulkhead integral with a part fixed to the central structure, which allows the outer panel(s) to be secured firmly to the fixed central structure when the nacelle is not undergoing maintenance, without the need to hole the acoustic shell ring in order to attach the fasteners;

the bulkhead has an opening configured so that the guide means pass through said opening, which thus makes it possible to increase the open access to the air intake structure because the guide means occupy a distance corresponding to the length of the central structure and that of the inner panel;

the bulkhead has a recess of a shape that complements at least part of the mounting means so that, in the closed position, the mounting means make the bulkhead airtight;

the air intake structure comprises mechanical or manual means of accompanying at least one outer panel along the guide means, which allows the air intake structure to be opened from the outside in a simple way;

the guide means comprise at least one stop means for stopping at least one outer panel, able to allow said outer panel or panels to be opened partially, which makes it possible to avoid having to fully remove the air intake structure where such full removal is undesired;

the central structure comprises means of centering and of positioning the guide means, which allows the guide means to be positioned optimally;

the air intake structure comprises equipment for deicing the air intake structure.

BRIEF DESCRIPTION OF THE DRAWINGS

The invention will be better understood from reading the nonlimiting description which follows, given with reference to the attached figures.

DETAILED DESCRIPTION

Figure 1:
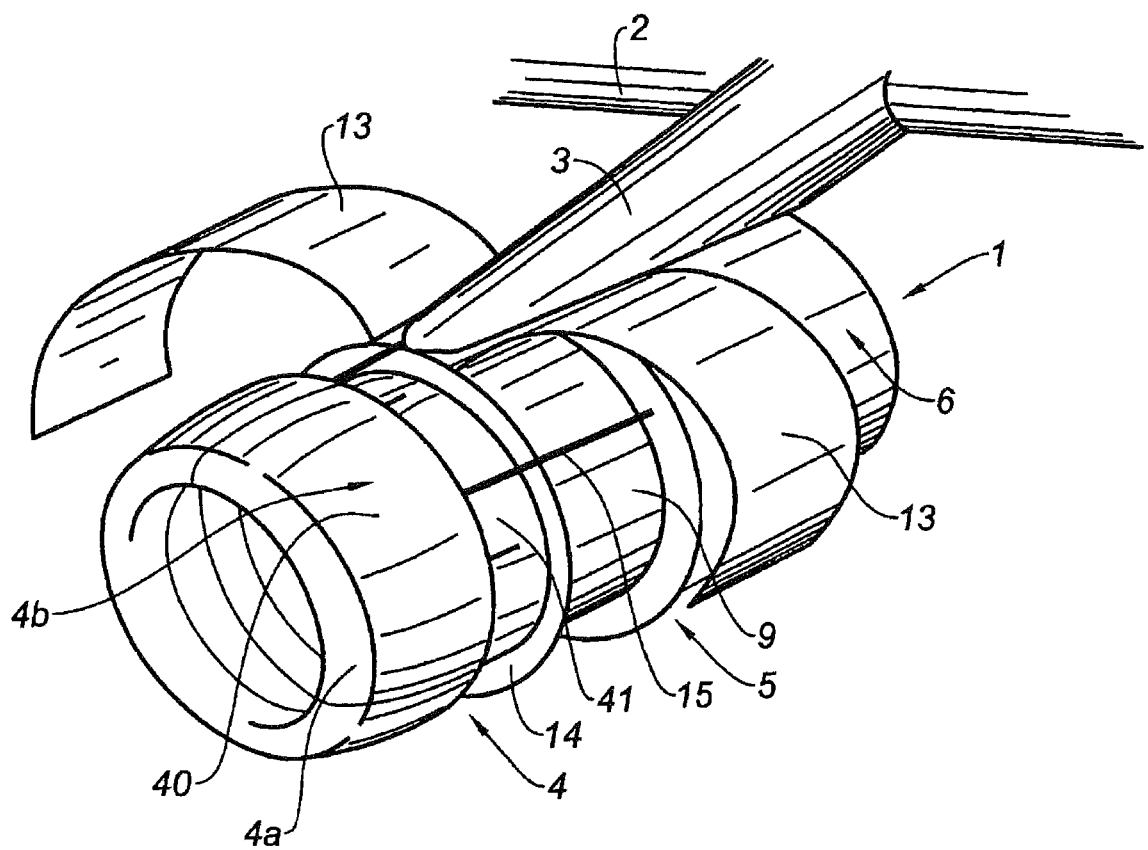
FIG. 1 is a schematic depiction of a nacelle according to the invention having an air intake structure comprising a lip incorporated into the outer panels.

A nacelle 1 according to the invention as depicted in FIG. 1 constitutes a tubular housing for a turbojet engine (not visible) the airflows generated by which it channels, defining internal and external aerodynamic lines needed to obtain optimum performance. It also houses various components required for the operation of the turbojet engine, together with auxiliary systems such as a thrust reverser.

The nacelle 1 is intended to be attached to a fixed structure of an airplane, such as a wing 2, via a pylon 3.

More specifically, the nacelle 1 has a structure comprising an air intake structure 4 upstream, a central structure 5 surrounding a fan (not visible) of the turbojet engine, and a downstream section 6 surrounding the turbojet engine and generally housing a thrust reverser system (not depicted).

The air intake structure 4 can be divided into two regions. The first region is an intake lip 4a designed for optimally gathering toward the turbojet engine the air needed to supply the fan and the internal compressors of the turbojet engine. The second region is a section 4b further downstream than the intake lip 4a and comprising at least one outer panel 40. According to the invention, the lip 4a is incorporated into the outer panel(s) 40 so as to form a dismountable single piece.

The air intake structure 4 may be modular and comprise a plurality of outer panels 40 each defining a corresponding portion of air intake lip 4a. In this case, the air intake structure 4 will have meeting lines which run longitudinally with respect to the nacelle 1. Said lines generally have only a negligible effect on the aerodynamic continuity of the air intake structure 4, unlike a nacelle of the prior art which has a peripheral line where the outer panel 40 and the lip 4a meet. Said meeting line usually runs transversely with respect to the direction of the airflow.

The nacelle 1 according to the invention also comprises a central structure 5 comprising a casing 9. The central structure 5 is attached to the air intake structure 4 in such a way as to ensure aerodynamic continuity.

At least one inner panel 41 extends the air intake lip 4a. The inner panel(s) 41 is(are) intended to channel the air suitably toward the blades (not depicted) of the fan. The inner panel(s) 41 is(are) attached at their downstream end to an upstream end of the central structure 5, notably at the casing 9, by fixing flanges. Thus, the inner panel(s) 41 forms(form) with the central structure 5 a structure that is fixed with respect to the nacelle 1 of the invention. Moreover, the inner panel(s) 41 comprises(comprise) an acoustic shell ring intended to deaden unwanted noise due to the operation of the turbojet engine and to the vibrations of the structure. The acoustic shell ring may be made up of a honeycomb structure or of any other structure able to deaden unwanted noise.

The nacelle 1 of the invention also comprises guide means 15 for guiding the outer panel(s) 40 and able to allow the outer panel(s) 40 to move in a substantially straight line toward the upstream end of the nacelle 1, so that the air intake structure can be opened up (see FIG. 1). The guide means 15 are entirely removably fixed to the central structure 5. In other words, no part of the acoustic shell ring is obstructed in order to allow the guide means 15 to be attached to the acoustic shell ring. As a result, practically the entire acoustic surface area of the shell ring can be used to deaden unwanted noise.

Advantageously, the air intake structure 4 comprises mechanical or manual mounting means, not depicted, for mounting at least one outer panel 40 along the guide means 15. These mounting means may be arranged, for example, on the exterior face or on a lateral face of the outer panel(s) 40 so as to simplify the opening of the air intake structure 4 from the outside of the nacelle 1 of the invention. Advantageously, the opening of said outer panel 40 can be performed only after the lateral cowls 13 with which the central structure 5 is equipped have been opened up. This then offsets any risk of unwanted opening of the air intake structure 4, particularly when the aircraft is in flight.

FIG. 1 illustrates an air intake structure 4 with an outer panel 40 in the partially open position revealing an inner panel 41. In the wide-open position, the air intake structure 4 reveals practically all of the inner panel 41. For preference, the guide means 15 comprise at least one stop means (not depicted) for stopping at least one outer panel 40 and able to allow the latter to be opened partially. Thus, it is possible for the air intake structure 4 not to be fully removed upon each maintenance operation. The stop means may be adjustable so as to adjust the length by which the air intake structure 4 is moved back, thus making it possible to obtain a degree of opening that varies according to the type of maintenance intervention desired.

Figure 2:
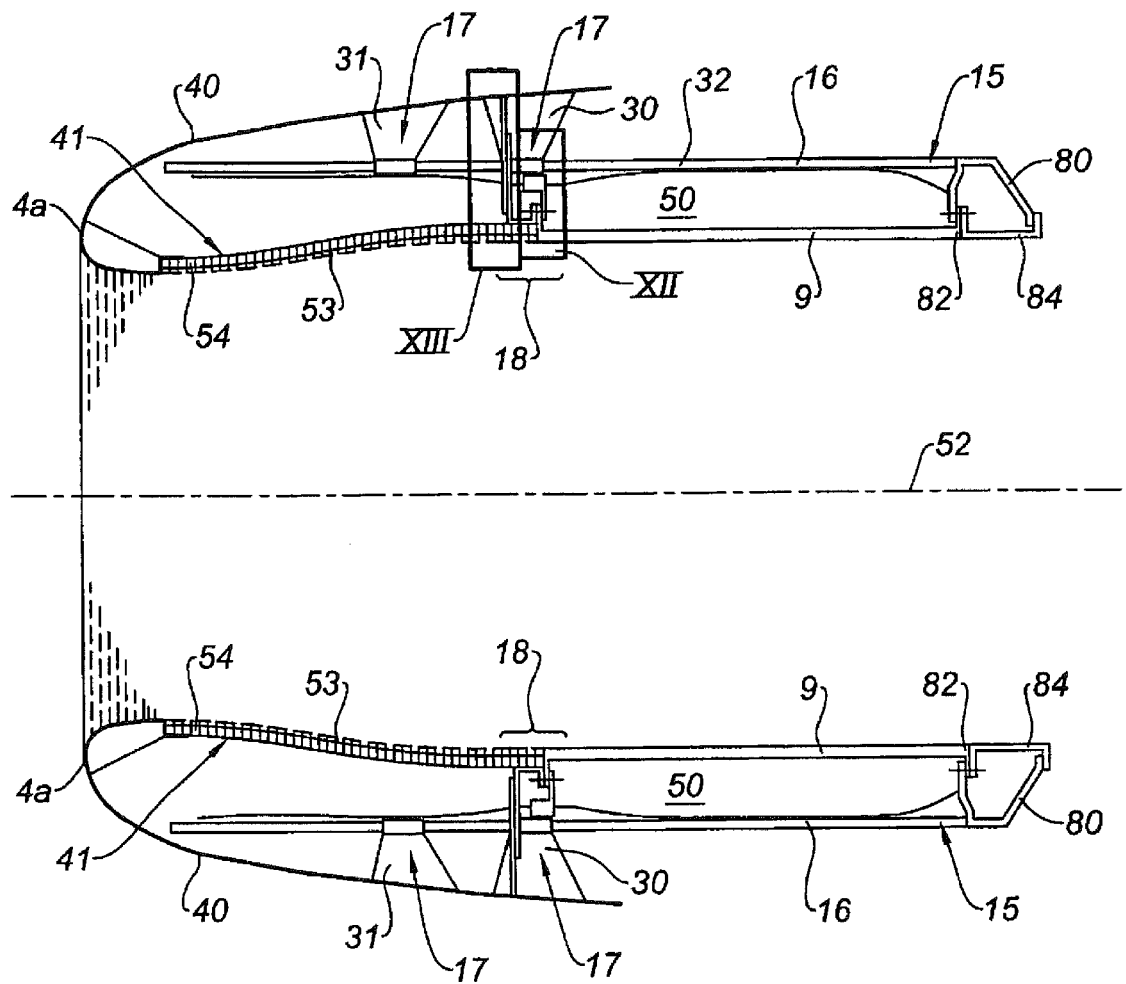
FIG. 2 is a schematic depiction in longitudinal section of a first embodiment of the air intake structure of FIG. 1, in the closed position.

The embodiment depicted in FIG. 2 corresponds to a nacelle 1 according to the invention in the closed position.

Figure 3:
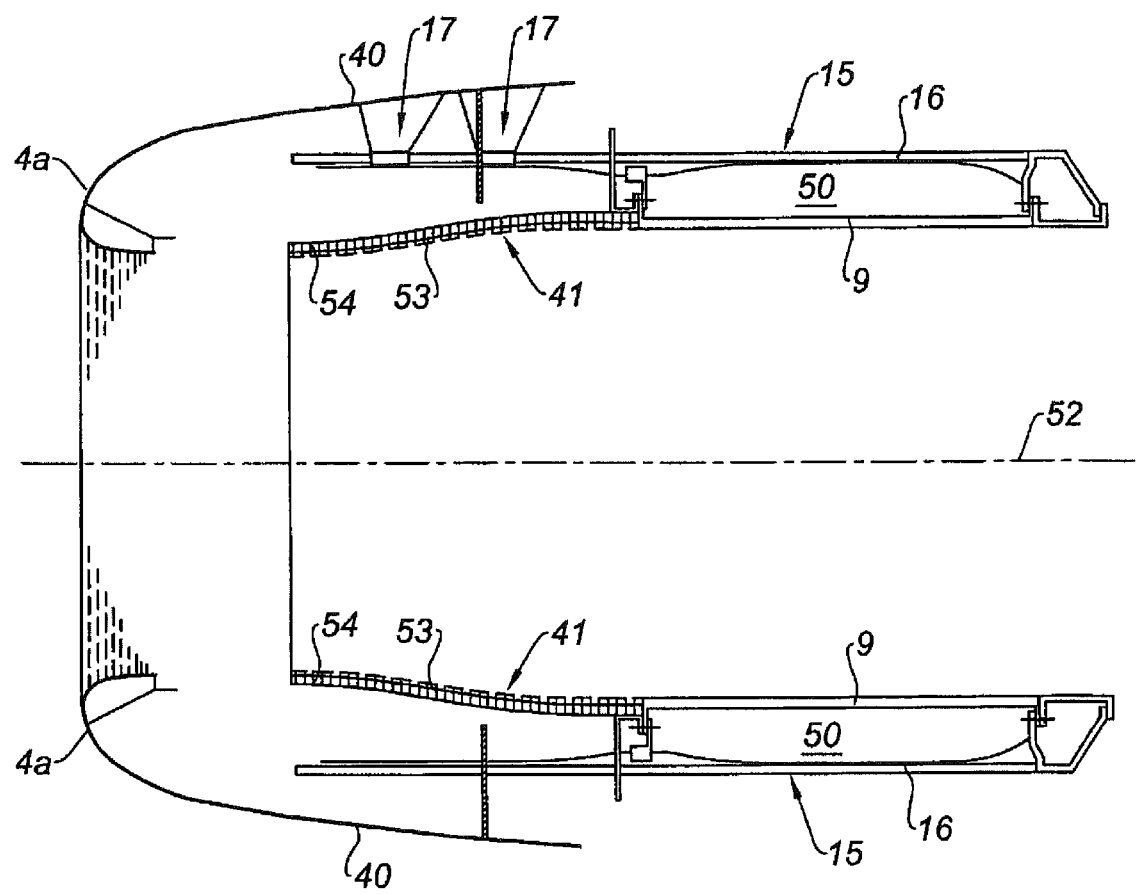
FIG. 3 is a schematic depiction in longitudinal section of the embodiment of FIG. 2, in the open position.

The embodiment depicted in FIG. 3 corresponds to the embodiment of FIG. 2 in the partially open position.

According to the embodiment depicted in FIG. 2, the guide means 15 comprise a system of rails 16 and mobile means 17 of mounting the outer panel 40 on the system of rails 16. The elongate shape of the system of rails 16 is able to afford a function of connection to the central structure 5.

Figure 4:
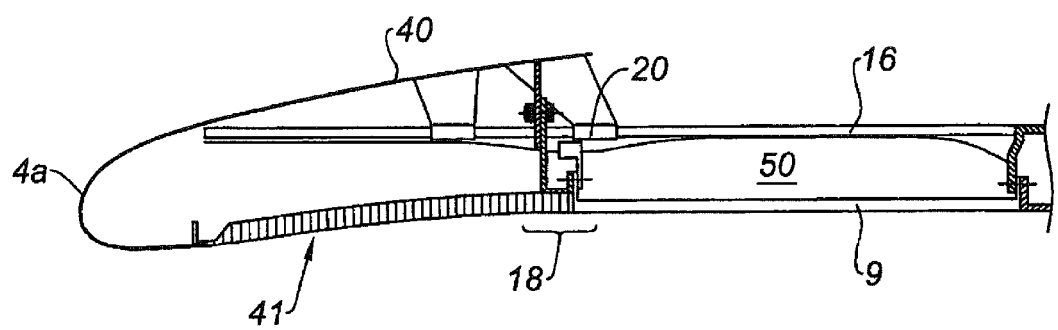
FIG. 4 is a partial schematic depiction in longitudinal section of an alternative form of the embodiment of FIG. 2.
Figure 5:
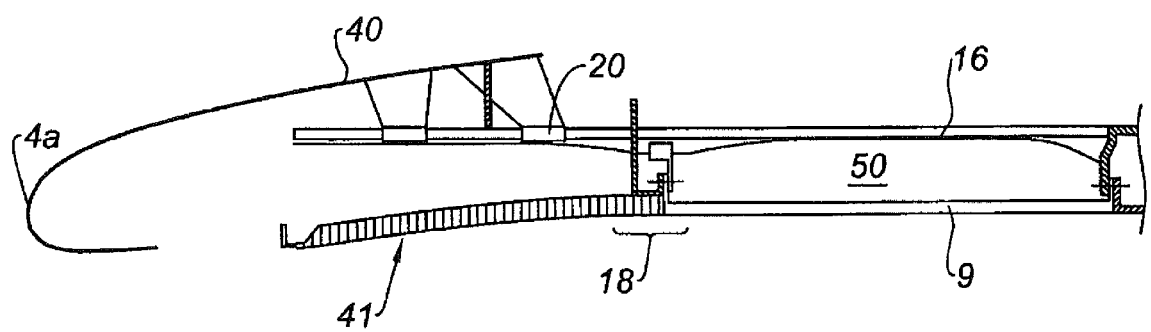
FIG. 5 is a partial schematic depiction in longitudinal section of the embodiment of FIG. 4.

According to the preferred embodiment depicted in FIG. 4, the air intake structure 4 of the invention is in the closed position. According to this embodiment, at least part 20 of the mounting means 17 is situated downstream of the region 18 where the central structure 5 and the inner panel 41 meet. As depicted in FIG. 5, in the open position, such a configuration allows the outer panel 40 to be moved over a distance greater than or equal to the sum of the length of the meeting region 18 and of the length of the inner panel 41. As a result, the distance covered by the outer panel 40 is greater than in Patent Application FR 06/08599, while at the same time maintaining practically the entirety of the effective acoustic surface area needed for sound deadening.

The mounting means 17 and the system of rails 16 may have any form able to allow longitudinal movement of the mounting means 17 with respect to the system of rails 16.

The embodiment depicted in FIG. 2 illustrates two sliders 30 and 31 able to slide longitudinally along the rail 32 with respect to the axis of the nacelle 1 according to the invention. The sliders 30 and 31 are connected at one of their ends to the outer panel 40 so as to carry the latter along in a translational movement. According to an alternative form, the mounting means 17 consist of one or more, not necessarily two, sliders.

In order to reduce jamming effects, the sliders 30 and 31 may partially surround the rail 32.

Figure 6:
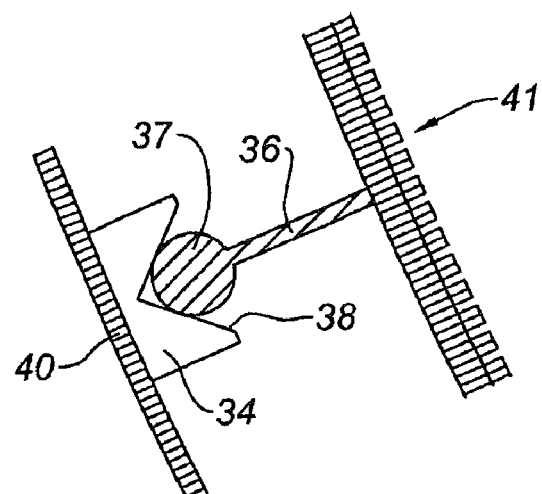
FIGS. 6 to 8 are alternative forms of the embodiment of FIG. 2.
Figure 7:
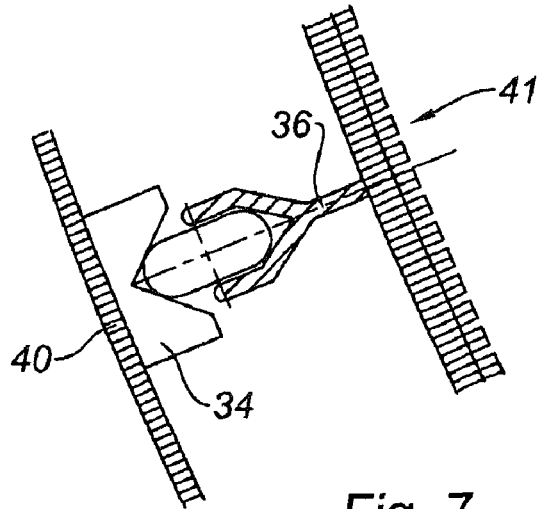

According to an advantageous alternative form depicted in FIGS. 6 and 7, the system of rails 16 comprises a channel-shaped rail 34 able to collaborate with a guideway system 36.

According to one embodiment, the channel-shaped rail 34 has a cross section of a different shape, notably of circular, triangular or some other shape. The guideway system 36 has an end of complementary shape (FIG. 7) or of a shape that minimizes friction (FIG. 6). Thus, for example, as depicted in FIG. 6, the guideway system 36 comprises a circular end 37 that comes into contact with the surface 38 of the triangular-section rail.

Figure 8:
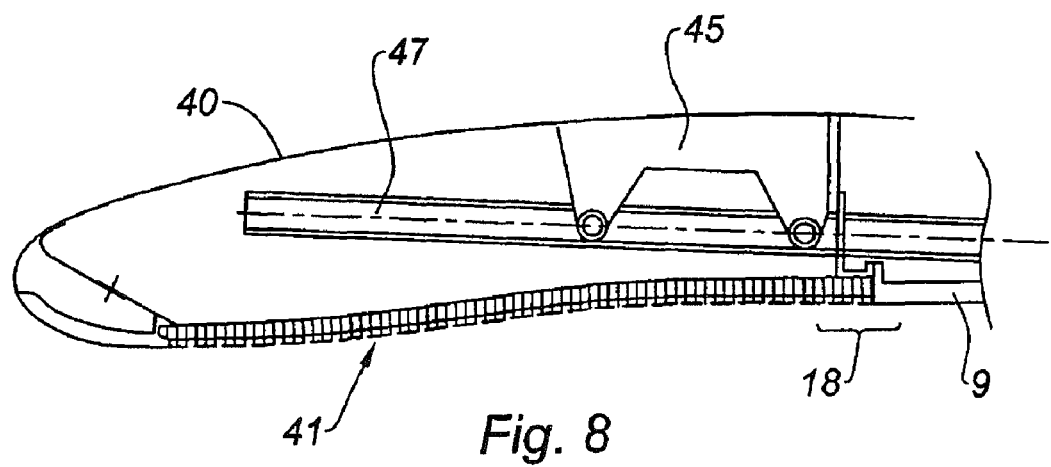

According to the embodiment depicted in FIG. 8, the mounting means 17 comprise at least one system of linear roller bearings 45 able to collaborate with a corresponding rail 47. The rollers of the linear roller bearing system 45 are able to limit friction with the rail 47 while at the same time ensuring effective movement of the outer panel 40.

According to another advantageous alternative form, the mounting means 17 comprise at least one longitudinal pin able to slide through a corresponding opening. By way of example, the opening may be made through means of attaching the outer panel 40 to the central structure 5 or to a supporting guide attached to the central structure 5.

According to a preferred embodiment depicted in FIGS. 2 and 3, the guide means 15 comprise a recess 50 that is substantially transverse to the axis 52 of the nacelle 1 of the invention, said recess 50 being situated downstream of the inner panel 41. Thus, the recess 50 allows engine components of the pipework and wiring type, for example, to be routed more easily, while at the same time allowing the air intake structure 4 to be moved.

For preference, the central structure 5 comprises centering and positioning means (not depicted) so that the positioning of the guide means 15 inside the nacelle 1 of the invention can be optimized. Thus, should it prove necessary to remove the guide means 15, subsequent repositioning thereof is performed quickly and accurately thanks to these centering and positioning means.

According to the embodiment depicted in FIG. 2, the inner panel 41 comprises an acoustic shell ring 53.

Changing the inner panel 41, notably the acoustic shell ring 53, does not entail removing the guide means 15. Thus, advantageously, there is no need for the additional step of re-fitting the guide means 15, which entails precise positioning, each time the inner panel 41 is changed.

According to the embodiment depicted, the closed position of the air intake structure 4 means that the acoustic shell ring 53 has to be fixed at its upstream end 54 to the air intake lip 4a by fasteners (not depicted) such as bolts. Said attachment is performed in such a way that the inner panel 41 is in permanent contact with the air intake lip 4a when the aircraft is in operation, notably is in flight.

Advantageously, the air intake lip 4a incorporated into the outer panel 40 ensures aerodynamic continuity with the acoustic shell ring 53. There are various alignment systems depicted by way of example in FIGS. 9 to 11.

The interface between the air intake lip 4a incorporated into the outer panel 40 and the acoustic shell ring 53 of the inner panel may itself be an external interface (FIGS. 9 and 10) or an internal interface (FIG. 11) but must ensure the best possible aerodynamic continuity. Rigid centering means, such as centering studs 56 (FIG. 11) able to collaborate with corresponding bores 58, or flexible centering means such as an elastic tab 60 (FIG. 9) provide this structural continuity.

A seal 62 may be fitted, indifferently, at the interface to either the inner panel 41 or the outer panel 40.

Figure 9:
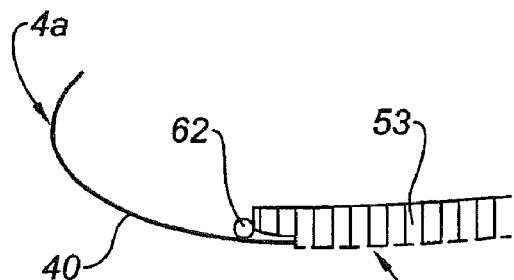
FIGS. 9 to 11 are enlarged schematic depictions of the region where an outer panel incorporating an air intake lip meets an inner panel.
Figure 10:
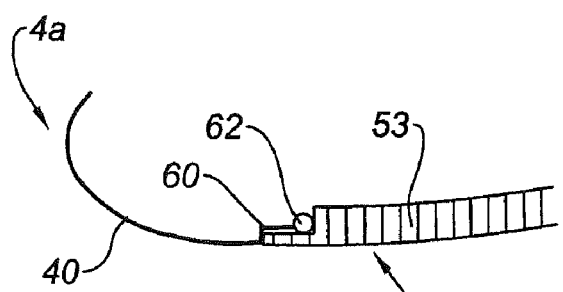
Figure 11:
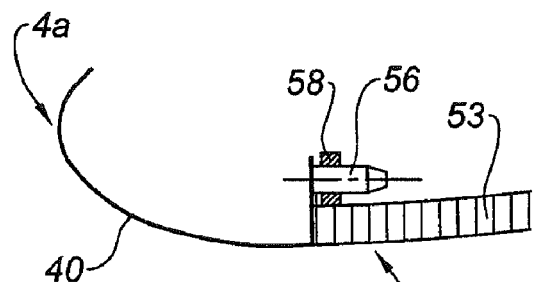

According to the embodiments depicted in FIGS. 9 and 10, the lip 4a and the inner panel 41 have an interface where said lip 4a and said inner panel 41 partially overlap when in the closed position. Advantageously, the interface has an upstream point forming an end stop, thus giving the attachment region some robustness.

These systems need to be able to ensure minimum clearance between the acoustic shell ring 53 and the air intake lip 4a so that this junction creates the least possible amount of aerodynamic disturbance.

Figure 12:
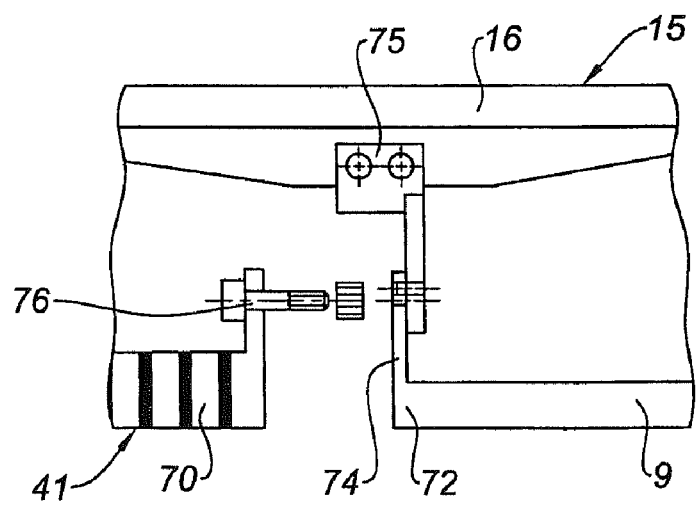
FIG. 12 is an enlargement of detail XII of FIG. 2.

As depicted in FIG. 12, the inner panel 41 is attached at its downstream end 70 to an upstream end 72 of the casing 9, therewith forming a fixed part of the nacelle 1 of the invention.

For that, the casing 9 at its upstream end 72 comprises a flange 74 to which the downstream end 70 of the inner panel 41 and the fixing means 75 of the guide means 15, notably of the system of rails 16, is attached. The downstream end 70 of the inner panel 41 may be attached by a simple system or a double fastener, on one side or the other of the casing 9 flange 74. According to one embodiment, the downstream end 70 and the fasteners 75 are not attached to the casing 9 at the same point. Thus, for preference, the casing 9 at its upstream end 72 has a plurality of orifices so that the attachment of the system of rails 16 can be adapted to suit the positioning of these rails.

The downstream end 70 and the fasteners 75 are, for example, attached by one or more bolts 76 to the casing 9, as depicted in FIG. 12.

It is also possible to use adapter fittings to provide the interface between the system of rails 16 and the optimum positioning of the holes in the casing flange 74. Moreover, according to the embodiment depicted in FIG. 2, the system of rails 16 is mounted at its downstream end via fasteners 80 to the downstream end 82 of the casing 9. The fasteners 80 are, for example, a fitting. The downstream end 82 of the casing 9 is notably attached to a flange 84. According to an alternative form, the system of rails 16 is secured to the casing 9 between the upstream end 72 and the downstream end 82, for example on a flange or a fitting that has been added on.

Figure 13:
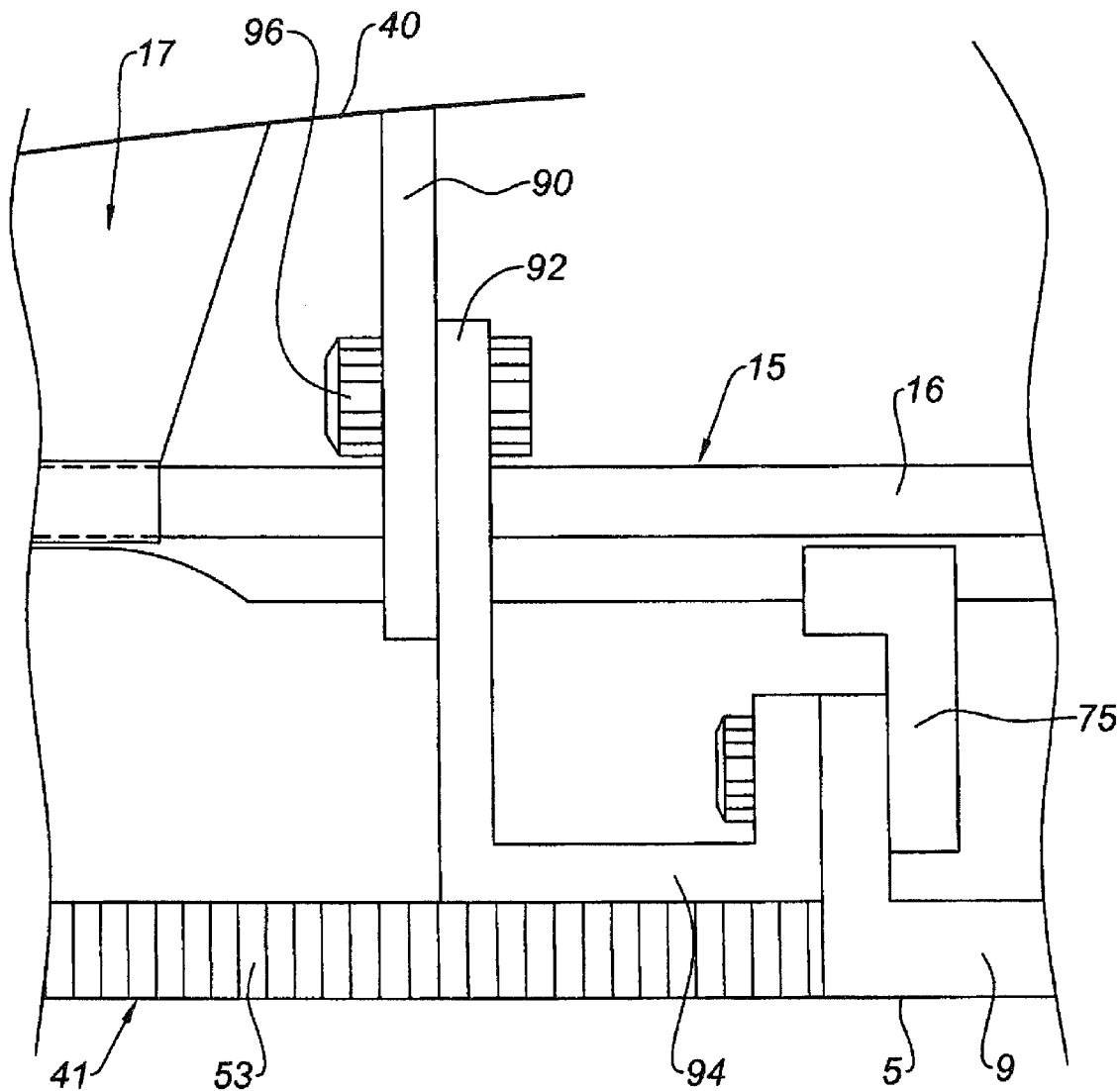
FIG. 13 is an enlargement of detail XIII of FIG. 2.

According to the embodiment depicted in FIG. 13, the outer panel 40 also has a front frame 90 that can be attached to a bulkhead 92 secured to an upstream part, notably an upstream flange 94, attached to the casing 9. Thus, the outer panel 40 is firmly attached to the central structure 5 without the surface of the acoustic shell ring 53 being holed in order to attach the outer panel 40. As a result, and unlike Patent Application FR 06/08599, practically all of the acoustic surface area of the inner panel 41 can be used and is able to deaden the unwanted noise due to the running of the turbojet engine.

The front frame 90 is substantially peripheral just like the bulkhead 92. The front frame 90 can be attached against the bulkhead 92 using fasteners 96 such as a nut/bolt system. The outer panel 40 is thereby attached removably to the bulkhead 92. The outer panel 40 incorporating the air intake lip 4a therefore, according to the invention, forms a removable part that can be attached to the fixed part and more particularly to the bulkhead 92.

According to a preferred embodiment, the bulkhead 92 comprises an opening that is configured so that the guide means 15 pass through said opening. Thus, the length over which the air intake structure 4 can be moved back is increased.

Figure 14:
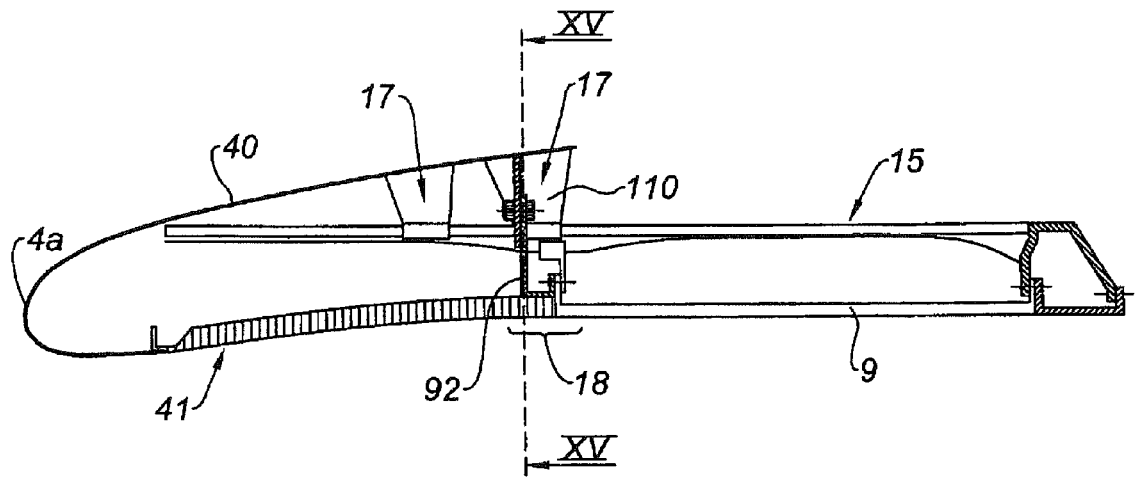
FIG. 14 is a schematic depiction in longitudinal section of an alternative form of the embodiment of FIG. 2.
Figure 15:
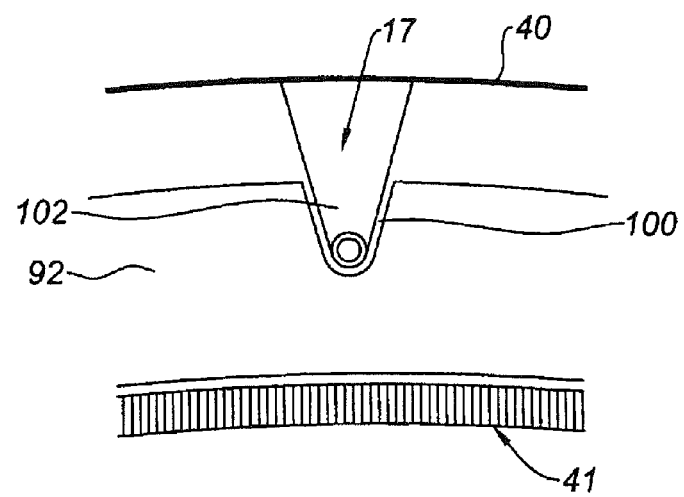
FIG. 15 is an enlargement of section XV of FIG. 14.

Airtightness between the downstream and upstream region on either side of the bulkhead 92 may be afforded for example by a fire seal between the bulkhead 92 and the mounting means 17. According to a preferred embodiment depicted in FIGS. 14 and 15, the bulkhead 92 has a recess 100 of a shape that complements at least part 102 of the mounting means 17 so that, in the closed position, the mounting means 17 afford airtightness to the bulkhead 92. Any seal known to those skilled in the art may be interposed between the mounting means 17 and the bulkhead 92. According to the embodiment depicted in FIG. 15, at least part 110 of the mounting means 17 comprises a section extending downstream and overlapping the bulkhead 92 and the meeting region 18.

Likewise, the joint between the front frame 90 of the outer panel 40 and the bulkhead 92 is sealed, for example, using a peripheral seal.

The bulkhead 92 may bear centering elements (not depicted) running at right angles to said bulkhead 92 in the upstream direction of the nacelle 1 of the invention. These centering elements also have a guiding role which determines the length of these centering elements.

The front frame 90 additionally has openings (not depicted) through which fasteners 96 and any centering elements there might be can pass when the outer panel 40 is correctly positioned and in the closed position.

The inner 41 and outer 40 panels may also have internal reinforcements (not depicted) to give said panels greater rigidity. These internal reinforcements are chosen by those skilled in the art such that they have the desired stiffness.

It will also be noted that the air intake structure 4 may extend axially, via its outer panel 40, beyond a flange used to attach the inner panel 41 to the fixed structure of the nacelle 1 of the invention, to reach the vicinity of the outer structure of a thrust reverser system belonging to the downstream section 6 of the nacelle 1 and possibly cover the cowls 13. A system of latches may then be provided to keep the air intake structure 4 on the bulkhead 92 secured to the structure of the casing 9 or an upstream structure of the downstream section 6.

According to a preferred embodiment that has not been depicted, the air intake structure 4 comprises equipment for deicing the air intake structure 4, said deicing equipment being located substantially on the lip 4a or incorporated into the lip 4a. Likewise, the inner 41 and outer 40 panels may have electrical deicing elements (not depicted). If they do, it will be advantageous to provide an interface for connecting an electrical power supply, for example on the front frame 90 of the outer panel or on the bulkhead 92 of the flange.

The invention claimed is:

1. A nacelle for a turbojet engine comprising:
   an air intake structure able to channel a flow of air toward a fan of the turbojet engine, and comprising at least one longitudinal outer panel incorporating an air intake lip,
   a central structure intended to surround said fan and to which the air intake structure is attached in such a way as to ensure aerodynamic continuity,
   at least one inner panel comprising an acoustic shell ring, said acoustic shell ring having a downstream end attached to an upstream end of the central structure and therewith forming a fixed structure of the nacelle, and
   guide means for guiding the outer panel or panels and able to allow substantially rectilinear movement of the outer panel toward the upstream end of the nacelle so that the air intake structure can be opened,
   wherein the guide means are entirely attached to the central structure.

2. The nacelle as claimed in claim 1, wherein the guide means are attached to a casing of the central structure, said casing configured to surround the fan and to provide aerodynamic continuity with the inner panel.

3. The nacelle as claimed in claim 2, wherein the upstream end of the casing comprises a plurality of orifices for adapting the attachment of the guide means to suit the positioning of said guide means.

4. The nacelle as claimed in claim 1, wherein the guide means comprise at least one system of rails and mounting means for mounting the outer panel or panels on the system(s) of rails.

5. The nacelle as claimed in claim 4, wherein at least part of the mounting means is situated downstream of a region where the central structure and one or more inner panel(s) meet in the closed position.

6. The nacelle as claimed in claim 4, wherein the mounting means comprise at least one slider (30, 31) able to collaborate with at least one corresponding rail.

7. The nacelle as claimed in claim 4, wherein the mounting means comprise at least one system of linear roller bearings able to collaborate with a corresponding rail.

8. The nacelle as claimed in claim 4, wherein the mounting means comprise a guideway system able to collaborate with at least one corresponding channel-shaped rail.

9. The nacelle as claimed in claim 4, wherein the guide means comprise at least one longitudinal pin able to slide through a corresponding opening.

10. The nacelle as claimed in claim 1, wherein the guide means comprise a recess essentially transverse to an axis of the nacelle, said recess being situated downstream of the inner panel(s).

11. The nacelle as claimed in claim 1, wherein at least one outer panel has a front frame that can be attached to a bulkhead integral with a part fixed to the central structure.

12. The nacelle as claimed in claim 11, wherein the bulkhead has an opening configured so that the guide means pass through said opening.

13. The nacelle as claimed in claim 11, wherein the bulkhead has a recess of a shape that complements at least part of the mounting means so that, in the closed position, the mounting means make the bulkhead airtight.

14. The nacelle as claimed in claim 1, wherein the air intake structure comprises mechanical or manual means of accompanying at least one outer panel along the guide means.

15. The nacelle as claimed in claim 1, wherein the central structure comprises means of centering and of positioning the guide means.

16. The nacelle as claimed in claim 1, wherein the air intake structure comprises equipment for deicing the air intake structure.

* * * * *